C. W. HEASLEY.
MACHINE FOR REMOVING GRASS.
APPLICATION FILED NOV. 29, 1913.
1,174,718.
Patented Mar. 7, 1916.
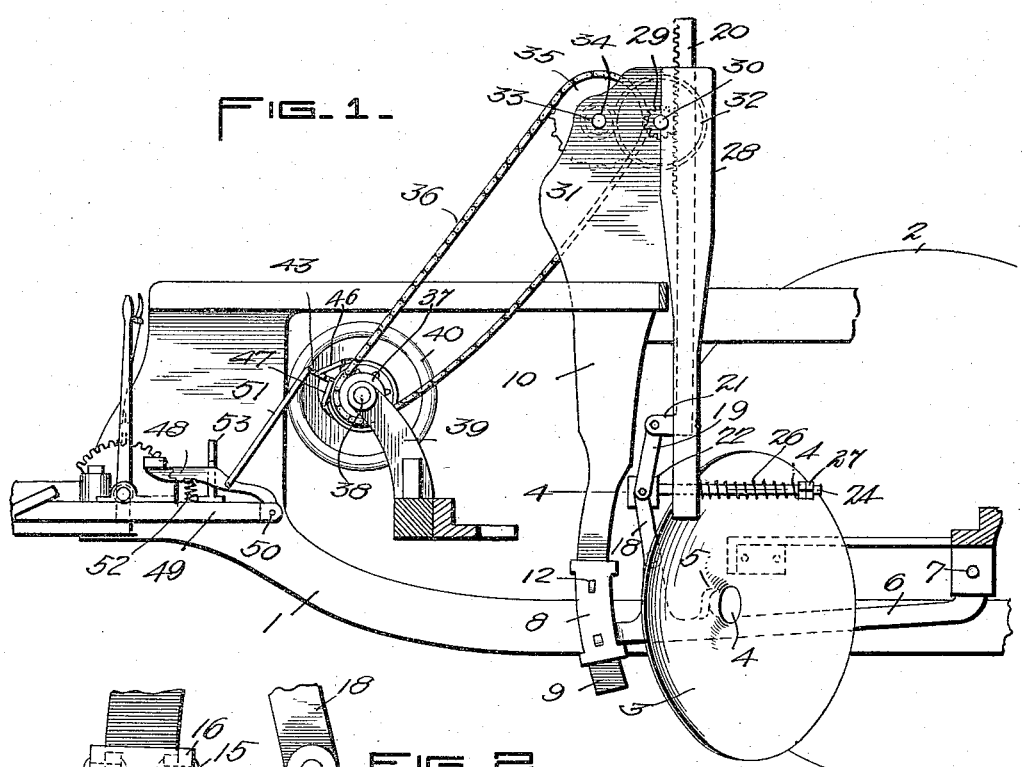
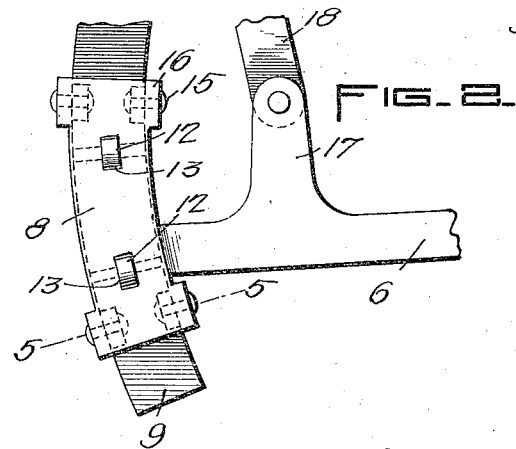
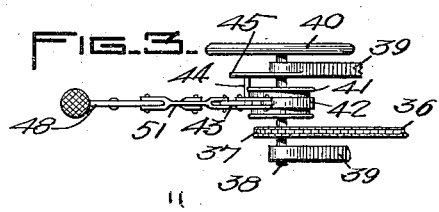
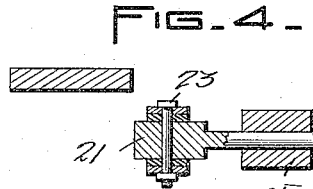
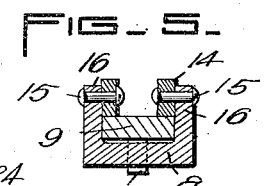
WITNESSES:
John F. Phillips
C. E. Trainor
INVENTOR
CHARLES W. HEASLEY,
BY
ATTORNEYS

UNITED STATES PATENT OFFICE.

CHARLES W. HEASLEY, OF GRANGEVILLE, IDAHO.

MACHINE FOR REMOVING GRASS.

1,174,718. Specification of Letters Patent. Patented Mar. 7, 1916.

Application filed November 29, 1913. Serial No. 803,694.

*To all whom it may concern:*

Be it known that I, CHARLES W. HEASLEY, a citizen of the United States, and a resident of Grangeville, in the county of Idaho and State of Idaho, have made certain new and useful Improvements in Machines for Removing Grass, of which the following is a specification.

My invention is an improvement in machines for removing grass, and the invention has for its object to provide mechanism in the form of a cutting disk, for cutting the grass below the surface of the ground and for lifting the cut grass and soil, and delivering it to separating mechanism.

In the drawings: Figure 1 is a side view of the improved plow; Fig. 2 is an enlarged detail view of a portion of the adjusting mechanism; Fig. 3 is a top plan view of the operating mechanism for the plow; Fig. 4 is a section on the line 4—4 of Fig. 1, and Fig. 5 is a section on the line 5—5 of Fig. 2.

The present embodiment of the invention is shown in connection with a supporting frame 1, having wheels of which one is indicated at 2, and the turning mechanism comprises a concavo-convex disk 3, which is secured to a journal pin 4 held in a bearing 5 intermediate the ends of a lever 6. The lever 6 is pivoted at its rear end to the frame 1, as indicated at 7, and adjusting mechanism is arranged at the opposite end of the lever for adjusting the plow.

A shoe 8 is rigidly connected with the opposite end of the lever 6 from the pivotal connection, said shoe extending transversely of the lever, and being arc-shaped as shown, being formed on the arc whose center is the pivotal connection of the lever. The shoe slidably engages an arc-shaped guide bar 9, depending from a plate 10 connected to the frame, and the guide bar is shaped to fit the shoe, and the shoe is provided with rollers for engaging the bar to decrease friction, and to prevent disengagement of the shoe.

Rollers 12 are journaled in slots 13 extending longitudinally of the shoe, and the said rollers extend through the slots into engagement with the guide bar. Each roller is journaled on a journal pin as shown, and other rollers 14 are connected with the shoe and engage the opposite face of the guide bar from that engaged by the rollers 12. The rollers 14 are journaled on journal pins 15 which are supported by laterally extending lugs 16 at the end of the guide shoe, and at opposite sides thereof. The lugs 16 extend beyond the opposite face of the guide bar from the shoe, and the rollers are journaled on the inner sides of the lugs. Thus each roller 14 engages the guide bar near the edge thereof, and at the opposite side from the shoe, to prevent disengagement of the shoe and to eliminate friction.

The lever 6 is provided with an upwardly extending arm 17 at the end adjacent to the shoe, and the operating mechanism for the disk is connected with the said arm. Toggle mechanism consisting of levers or members 18 and 19 is arranged between the arm 17 and a vertically moving rack bar 20. The levers 18 and 19 are in pairs, each lever consisting of a pair of oppositely arranged members. The lower ends of the members of the lever 18 are pivoted to the arm 17, and the upper ends of the members of the lever 19 are pivoted to a laterally extending lug 21 on the lower end of the rack bar 20. The adjacent ends of the levers 18 and 19 are pivoted to a block 22, by means of a bolt and nut 23.

The block 22 is provided with a laterally extending rounded stem 24, and this stem passes through a fixed guide 25 on the frame, intermediate the ends of the stem. A coiled spring 26 encircles the stem between the fixed guide and stops 27 in the form of nuts threaded onto the stem at the opposite end from the block. The spring acts normally to hold the toggle in alinement, but should there be undue pressure or strain on the disk 3, the toggle may break to prevent injury to the disk and connected parts.

The rack bar 20 is mounted to slide in a guide 28 supported by the frame, and the teeth of the rack bar engage the teeth of a pinion 29 secured to a shaft 30 journaled transversely of the frame in uprights or standards 31. A gear wheel 32 is secured to the shaft 30 and this wheel meshes with a pinion 33 on a counter-shaft 34 journaled in the standards or uprights 31 parallel with the shaft 30.

The shaft 34 is provided with a sprocket wheel 35 which is engaged by a chain 36, the said chain connecting the sprocket wheel 35 with a sprocket wheel 37 on an operating shaft 38 journaled parallel with the shafts 30 and 34 in standards 39 on the frame. The shaft 38 is provided at one end with a hand wheel 40, for convenience in rotating the shaft and it will be evident that when the said shaft is rotated, the rack bar 20 will be moved upward or downward, depending upon the direction of the rotation of the shaft 38. The shaft 38 is operated manually by the hand wheel 40, and brake mechanism is provided in connection with the shaft for holding the same from movement when the plow is in proper position.

This brake mechanism comprises a brake disk 41 secured to the shaft intermediate the ends thereof, and a band or strap 42 encircles the disk. A lever 43 is arranged adjacent to the disk and in front thereof, and said lever is pivoted intermediate its ends on a journal pin 44 extending inward from an extension 45 of one of the uprights or standards 39. Links 46 and 47 connect the opposite ends of the strap 42 with the lever, the link 46 being pivoted to the lever on one side of the pivotal connection, while the link 47 is connected to the lever on the other side of the said connection.

A treadle lever 48 is pivotally connected to a platform 49 at the front of the frame, as indicated at 50, and a link 51 connects the lever intermediate the ends thereof with the outer end of the lever 43. The treadle lever is normally pressed upward by a coiled spring 52 arranged beneath the same and between the treadle lever and the platform, and a ratchet bar 53 is provided for holding the treadle lever in adjusted position.

The operation of the improved plow is as follows: The machine is drawn through the field in any suitable manner, and by means of the hand wheel 40 the plow is adjusted to the proper depth. By means of the treadle lever 48, the plow is locked in the desired position, and as the machine moves through the field, the plow will cut beneath the grass, and will turn the same upwardly and outwardly, delivering it to any suitable form of separating mechanism. Should the plow meet with an obstruction, the toggle mechanism will yield, permitting the plow to move upward, without causing injury to the same or connected parts. The lever 6 is guided at its free end in its vertical movement by the shoe and guide bar construction.

I claim:

1. In a machine of the character specified, a wheel supported main frame, an arm pivoted to the main frame at one end, a concavo-convex disk journaled on the arm for turning the soil, and means for raising and lowering the free end of the arm, said means comprising a rack bar mounted for vertical sliding movement in the main frame, a toggle joint connection between the lower end of the rack bar and the arm, a guide for the free end of the arm, a spring normally holding the toggle joint in alinement, but mounted to yield to permit the plow to move upwardly, a pinion meshing with the rack bar, and means for rotating the pinion, said means comprising a hand wheel journaled on the main frame and having a driving connection with the pinion, a brake in the hand wheel, and means for locking the brake to prevent rotation of the hand wheel.

2. In a machine of the character specified, a wheel supported main frame, an arm pivoted to the main frame at one end, a concavo-convex disk journaled on the arm for turning the soil, and means for raising and lowering the free end of the arm, said means comprising a rack bar mounted for vertical sliding movement in the main frame, a toggle joint connection between the lower end of the rack bar and the arm, a guide for the free end of the arm, a spring normally holding the toggle joint in alinement, but mounted to yield to permit the plow to move upwardly, a pinion meshing with the rack bar, and means for rotating the pinion.

3. In a machine of the character specified, the combination with the frame, of an arm pivoted at one end of the frame, a plow supported by the arm intermediate the ends thereof, a guide for the free end of the arm for constraining it to move vertically, means for adjusting the arm vertically, a toggle joint connection between the arm and the adjusting means, and yielding mechanism normally holding the toggle joint in alinement.

CHARLES W. HEASLEY.

Witnesses:
F. L. LEONARD,
W. C. SCHAEFER.

Copies of this patent may be obtained for five cents each, by addressing the "Commissioner of Patents, Washington, D. C."